July 1, 1941.    E. R. BURTNETT    2,247,478
MULTICLUTCH MECHANISM
Filed Aug. 11, 1936
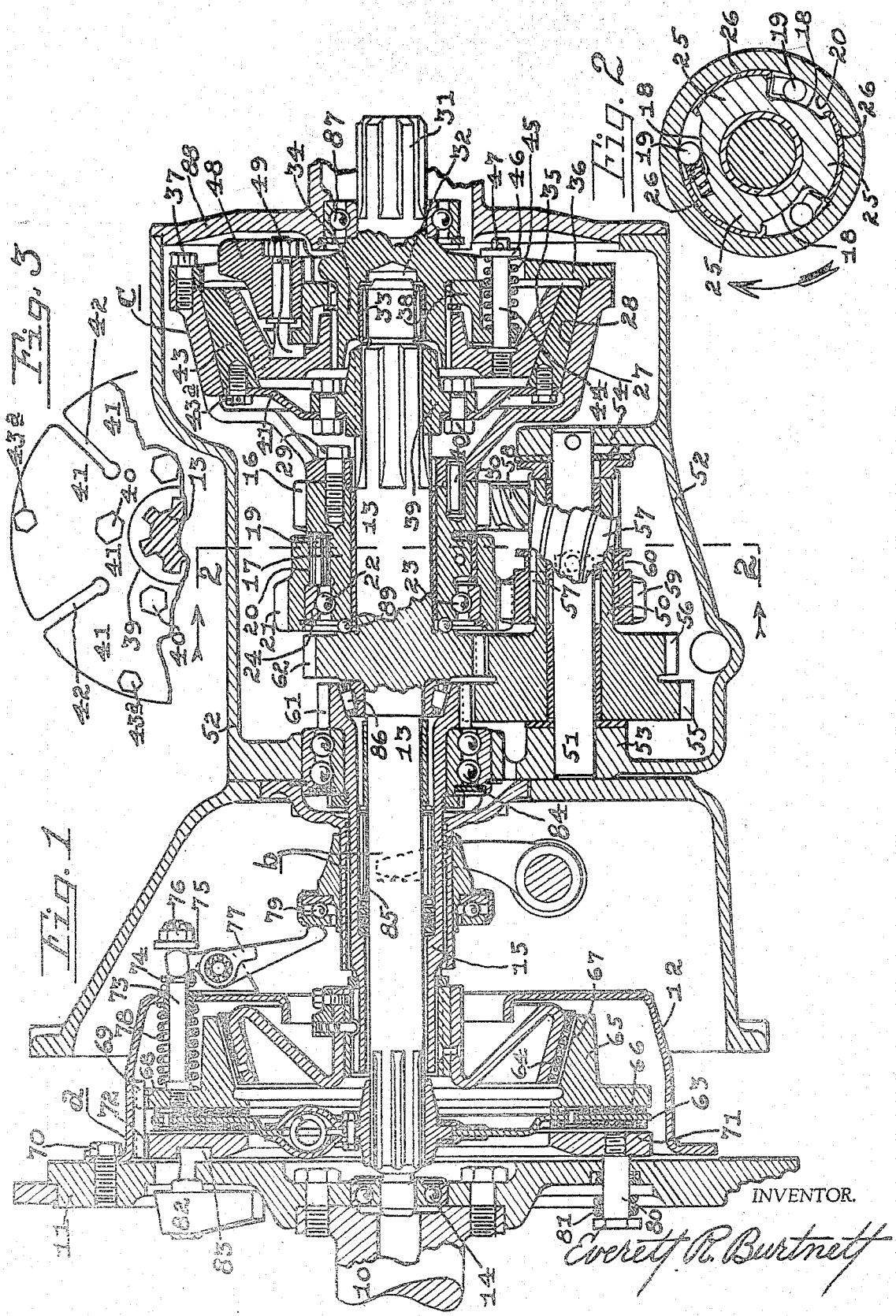
INVENTOR.
Everett R. Burtnett Patented July 1, 1941

2,247,478

UNITED STATES PATENT OFFICE 2,247,478

MULTICLUTCH MECHANISM

Everett R. Burtnett, Los Angeles, Calif., assignor to Automotive Improvements Patents Corporation, Los Angeles, Calif.

Application August 11, 1936, Serial No. 95,357

15 Claims. (Cl. 192—48)

This invention relates to change speed power transmissions, and more particularly to motor vehicle transmissions.

A principal object of the invention is to provide an improved motor vehicle transmission embodiment of automatic and optional-operator-controlled change speed power transmitting mechanism, particularly wherein a two-way drive undergear drive, employable for reacting the drive of vehicle momentum upon the vehicle engine to bring the compression of the latter into play as a brake against the vehicle momentum is provided and fitted with an optionally engageable friction clutch mechanism unit exclusively engageable under control of the operator, and in connection with a speed responsive automatic change speed clutch mechanism for connecting a certain other speed ratio of drive; the operator-controlled-optionally engageable clutch mechanism is inter-control related with the automatic clutch so that the latter will be caused to open under the influence of initial actuation of the optionally-engageable clutch with the result of subsequent change from an automatic clutch established certain speed ratio of drive to the alternative of an optionally engageable friction clutch means established positive under-gear drive.

Another object of the present invention is to improve the form, combination and arrangement forming the subject of my co-pending application, Serial No. 696,682 filed Nov. 4, 1933, which issued as Patent No. 2,086,600 July 13, 1937.

More specifically, my invention relates to a motor vehicle change speed power transmission having a flywheel constituting the vehicle-engine-driven driving member; a conventional intermediate main transmission shaft next in axial alignment with, and for direct drive coupling to, the engine-driven driving member; a conventional drive main transmission member next-in-axial alignment with the intermediate shaft and for propelling the vehicle; a fixed axis parallel countershaft; and wheel type gears for effecting indirect drive speed ratios between the main aligned transmission shaft line members through the medium of the parallel countershaft. Since this transmission shaft and gear embodiment, having the virtues of utmost simplicity, low cost and ruggedness, has become standard in automotive practices, the present invention contemplates provisions therewith and such other improvements to the end of providing a reliable automatic change speed transmission which will retain the above stated virtues and parallel in general design the time proven present day manual shift transmission member coordinates such that the experience in manufacture and servicing may be taken advantage of in the advent of automatic transmissions.

More particularly, the present invention relates to the provision, in connection with the same general transmission member combination as hereinbefore described, of a novel form of combined speed responsive automatic clutch and optionally engageable change speed clutch mechanism, both cooperative with the engine driven driving member (flywheel), to afford frictionally-engageable means control of the variable speed transmitting unit.

More particularly, the present invention relates to the provision, in connection with the same general transmission member combination as hereinbefore described, of a novel initial transmitting shaft-to-vehicle propelling member drive through the medium of the parallel countershaft which is selective either for forward or reverse low ratios of drive, and of a novel means including a driven member speed responsive automatic clutch mechanism for connecting the driven member to be driven from the intermediate shaft at a higher speed ratio.

A further object of the present invention is to provide, an automatic initial drive coupling at reduced speed and automatic change to a higher speed ratio of drive transmission, with an improved optional control over one of the automatic controlling devices to change the speed of the transmission.

A further object of the present invention is to provide, an automatic change speed transmission with an improved form and arrangement of selective initial vehicle propelling forward and reverse gearing.

Referring to the drawing:

Figure 1 is a vertical longitudinal section of a motor vehicle change speed transmission constructed in accordance with the present invention.

Figure 2 is a vertical transverse section taken on line 2—2 of Fig. 1 illustrating the direction of one-way drive of the overrunning clutch in the initial vehicle propelling forward gear drive of the transmission.

Figure 3 is an axial end elevational fragmentary view of the flexible clutch cone mounting disk 41.

Figure 1 illustrates a preferable adaptation of the features of the present invention coordinated with the aforementioned general design or form of conventional transmission shaft and gear construction. It involves the provision of a centrifugal automatic clutch and a sub-clutch for optional engagement and whose engaging pressure effects disengagement of said centrifugal clutch, both arranged in the engine flywheel and substituting for the usual single clutch therein; substituting the conventional next-in-ratio-to high manual shift clutch with another centrifugal automatic clutch for effecting automatic change speed control beyond that of the multi-flywheel clutch mechanism; and substituting a lowest speed ratio of the forward drive range connected by an overrunning clutch mechanism for the conventional manually selective positive (two-way driving) form of lowest forward speed ratio gear drive of the gearset. All whereby, three different forward speed ratios of drive are obtainable without a shift of dentate type drive connecting elements and whereby an alternative low to automatic second or an alternative engine compression brake utility second-to-automatic high is optionally obtainable also eliminating a shift of gear or other positive forms which have the character of being clashable. It will be understood that various changes and modifications can be made and other forms used in any of the components forming the combination embodiment of the present automatic and optional change speed transmission invention, without departing from the spirit of the invention.

Referring to the drawing for a more detailed understanding of the preferred detail provisions and structural forms and relationships of parts of my present invention, I show a crank shaft 10 of the vehicle engine to which is fixed a flywheel 11 and a clutch cover 12, all forming a rotatably connected driving member designated a.

In axial alignment and next-in-drive connectable relation with the driving member a, I show an intermediate shaft construction embodying a main intermediate shaft 13, sometimes referred to as a clutch shaft, conventionally pilot journalled by a bearing 14 in the recessed end of the engine crank shaft 10, and a sleeve-shaped secondary intermediate shaft 15, which may be considered as another clutch shaft, concentric with and for rotation around said main intermediate shaft 13. The two intermediate shafts 13 and 15 together form an intermediate of axially aligned transmitting elements designated b and are, respectively, operable as separate input members to the change speed gearset each driving to a different speed ratio of drive thereof.

In the continued axial alignment of main transmitting member construction, I show a driven member designated c, composed of a reverse drive driven gear 16 having a forwardly extending hub portion 17, the periphery of which is cammed, as designated by 18 (see Fig. 2), for wedging of overrunning clutch rollers 19 to cause one way forward drive rotation of the gear 16 and hub portion 17 from an annulus 20 integral with a forward drive driven gear 21, and the periphery of which hub portion 17 is also circumferentially grooved as a raceway 22 for balls 23, which latter serve to mount the gear 21 free to rotate relative to the hub 17 through the medium of an outer race 24. The intermediate radial projections 25 (see Fig. 2) of the hub 17 between the overrunning clutch rollers 19 are capped with plain bearing faces 26 for engagement with the annulus 20 for lending alignment bearing assistance to the ball bearing 23 in the rotatable relative mounting of the gear 21 on the hub 17. A next constituent part of the driven member c is an enlarged intermediate part 27 preferably in the form of a spider, having an inner circumferential friction clutch cone face 28 to form a bottom friction driven element of a friction clutch, and secured by cap screws 29 and dowel pin 30 to the gear 16. A next constituent part of the driven member c is a driven shaft member 31 for connection to propel the vehicle and having a recess 32 accommodating a pilot bearing 33 which in turn mounts the thereadjacent end of the main intermediate shaft 13. This final driven constituent part 31 also has a forwardly extending hub portion 34, preferably splined on its outer periphery to take a presser driven clutch cone 35 in hub-keyed relation longitudinally movable thereon but to rotate therewith, and a flange portion 36 secured at its outer rim by means of capscrews 37 to the open edge or rim of the clutch cone faced portion of the intermediate spider part 27. Besides the aforenamed parts of the final driven or vehicle propelling driven member c of the axially aligned transmission member embodiment of the change speed transmission, a base or fixed supporting member 38, for centrifugal weights, also splined to the hub portion 34 of the take-off shaft part 31 may be considered as a constituent part of the driven member c.

For direct drive coupling the main intermediate shaft 13 at its driving end to the driven member c, the periphery of the shaft 13, adjacent its pilot bearing spigot end, is splined and a correspondingly splined driving-clutch-cone hub 39 is mounted thereon. To this hub 39 is secured by bolts 40 a thin disk 41 preferably split, as designated by 42 (see Fig. 3) from its outer rim inwardly to a point in close proximity to the hub 39. Thusly, the disk 41 forms a flexible means for mounting a driving clutch cone 43 between the driven clutching cones 28 and 35, whereby the driving cone 43 is allowed sufficient freedom to flexibly align itself under initial engagement with its mating cones 28 and 35 as to eliminate clutch chatter with this type of clutch. Capscrews 43ª secure the driving clutch cone 43 to the disk 41. The hub 39, carrying the flexible cone clutch carrying disk 41, cooperates as a coaxial intermediary power transmitting member.

To render the double faced cone clutch mechanism between the main intermediate shaft 13 of element b and the vehicle propelling driven element c automatically operative in response to sufficient speed of rotation of the driven member thereto, I show a stud 44, representing a series of the same, threaded into an aperture in the presser cone driven clutch member 35. Encircling each of the studs 44, is a spring 45 for compression between a washer 46 held in position on the stud 44 by a pin 47 and the fixed centrifugal weight base member 38. These springs 45 operate to normally pull the presser driven clutch cone member 35 out of engagement with the driving intermediate clutch cone member 43, effecting a normally open clutch. For effecting engagement of this clutch automatically upon sufficient speed of rotation of the vehicle propelling driven element c, I show a centrifugal weight 48, representing a series of the same, having feet 49 wedged between the fixed centrifugal weight base member 38 and the presser driven clutch cone member 35. It will be seen that the body of the weight 48 under rotation will tend through the medium of the weight foot 49 to pry the presser driven clutch cone member 35 relatively away from the fixed member 38 with resultant clutching of the driving clutch cone 43 between the bottom driven clutch cone 28 and the presser driven clutch cone 35.

As an out-of-line power transmitting element between driven and driving gears of the wheel type and for obtaining multiplication of the torque under transmission through wheel type gears, I show a countershaft 50 mounted parallel to the axially aligned main transmission member construction of *a*, *b* and *c* elements. I show this countershaft 50 mounted rotatable around a fixed axis by the simplest means consisting of a bar 51 and a gear box 52 having end portions 53 and 54, respectively, in abutment with, and supporting the opposite ends of, the bar 51. A pair of adjacent driven gears 55 and 56, preferably constructed as an integral part of the countershaft 50, and a splined shaft portion 57, also preferably formed as an integral part of the countershaft 50, make up the positively fixedly attached gear and shaft components of the countershaft 50. To render the countershaft 50 operative to either forward or reverse drive the final driven element *c* of the axially aligned main transmission member construction, I show a reverse idler gear 58 in constant mesh with the reverse drive driven gear 16, and for longitudinal shifting selectively into mesh with one or the other of the forward drive driven or reverse idler gears 21 and 58, I show a correspondingly splined pinion 59 mounted axially shiftable on the shaft portion 57 of the countershaft 50. Preferably the countershaft 50-to-pinion 59 spline provision is spiral in form permitting the use of spiral toothed forward and reverse intermeshable selective gears as well as in the constant mesh gearing making up the balance of gear components of the change speed transmission. A groove 60 is formed in the periphery of the shiftable pinion 59 to receive a cooperating shift element (not shown).

To complete a two-way driving connection between the countershaft and the main intermediate shaft 13 or the secondary intermediate shaft 15, I show a drive gear 61 preferably formed as an integral part of the secondary intermediate shaft 15 constantly meshing with the first gear 55 of the countershaft gear cluster, and a gear 62 rotatable with the main intermediate shaft 13 and constantly meshing with the second gear 56 of the countershaft gear cluster. By this means the two concentric clutch or intermediate shafts 13 and 15 are positively geared to drive each other in either direction and each to drive the countershaft 50 in either direction. This arrangement of dual intermediate shafts 13 and 15 each to drive a different speed ratio gear has associated therewith an optionally engageable flywheel clutch for forcing an automatically engageable flywheel out of engagement for selectively controlling the shafts 13 and 15. And particularly in connection with the positive type two-way drive gearing connecting the alternately employable intermediate shafts 13 and 15 through the medium of the fixed axis countershaft, such that the latter may contribute under flywheel clutch control to two-way drive capable transmission embodiment in either of the speed ratios of drive established by the multi-flywheel clutch mechanism, is contemplated to the end of providing flexible change between different speed ratio positive two-way drive transmitting trains advantageously over the conventional "declutch and shift gear" requirements in conventional manual shift transmissions, and over ordinary centrifugal automatic clutch provisions in the flywheel in conjunction with gear drives having one-way drive capacities only. Illustrating the present invention, I show a conventional form of driven frictionally-engaging clutchable member 63, usually termed a driven clutch disk, carried in the usual splined relation on and rotatable with the main or inner one 13 of the two intermediate or concentric clutch shafts 13 and 15. For driving the other, outer or secondary intermediate or clutch shaft 15, I show a frictionally-engageable cone shaped driven clutch member 64, being adapted to serve as a bottom pressure-taking member, and carried in splined relation on and rotatable with the outer shaft 15. Disposing these two independently clutchable members 63 and 64 in adjacency lends to their being respectively alternatively engaged by a single frictionally-engaging driving clutch member carried in rotation with the flywheel 11 and operable as a driving clutch member common to both, a clutch means for coupling one and a clutch means for coupling the other of the two concentric transmitting members 13 and 15 to turn with the engine driven driving element *a*. This common driving clutch member, I show in the form of a member 65 having a forward flat friction face 66, engageable by the flat driven clutch disk 63, and having a rearward cone friction face 67 adapted to be brought into engagement with the driven cone clutch member 64. This common driving clutch member 65 is shown mounted rotatable with, but longitudinally movable at grooves 68 fitting over guide bar portions 69 of the cover 12, which latter is shown secured to the flywheel 11 by means of capscrews 70.

To complete the multi-clutch means for individually coupling either of the intermediate members 13 and 15 to their common axially aligned driving element *a*, I show a presser frictionally-engaging driving clutch member 71 having a flat friction face adapted to be brought into engagement with the flat driven clutch disk 63 and disposed between the latter and the disk portion of the flywheel 11. This member 71 is also grooved 72 to fit over the bars 69 so as to be carried rotatable with, but longitudinally movable relative to, the flywheel 11. A series of several equally circumferentially spaced studs 73 are threaded in apertures formed in the common driving clutch member 65, which studs 73 are extended through the cover 12, and provided with washers 74 and 75 and an adjusting nut 76 by which means levers 77 of optional control means are connected to pull the common driving clutch member 65 rearwardly. A series of main clutch springs represented by 78 form a yieldable means compressed and operating between the cover 12 and the driving clutch member 65, which latter is intermediately interposed between the flat disk and cone driven clutch members 63 and 64, to urge the member 65 to occupy a normal forward position in which it is engageable by, and contributory to, the individual clutching of the flat driven disk 63. The usual clutch throw-out bearing 79 is provided for thrusting against the levers 77, as in the conventional clutch mechanism, but in this case for effecting a pull, at the option of the operator, upon and to take the duo-purpose driving clutch member 65 out of a position in which the disk 63 is rendered clutchable and into another and alternative position in which it is established in a state of engagement with the cone driven clutch member 64. Bolts 80 and cooperating springs 81 constitute means operative yieldably to normally urge the presser driving clutch plate 71 forwardly out of engagement with the thereadjacent flat driven clutch plate 63; and a series of centrifugal weights 82 for actuating the presser member 71 rearwardly into engagement with the driven clutch plate 63 are provided, mounted to rotate with, and to be responsive to, the speed of the engine driven driving member $a$ by means of their feet portions 83 being wedged between the presser driving clutch member 71 and the thereadjacent disk portion of the flywheel 11.

The usual front main transmission bearing 84 is arranged in the front wall of the gear box 52 and serves to journal the outer of the two clutch shafts or concentric transmitting members 13 and 15, while a roller bearing 85 and a taper roller bearing 86 operate to journal the inner of these two concentric shafts within the outer member. The usual rear main transmission bearing 87 is supported in a detachable rear end part 88 of the gear box 52 and operates to journal the output shaft portion 31 of the vehicle propelling driven element $c$ of the axially aligned main transmission member. A ball bearing 89 is provided between the forward end of the main driven element $c$ and an abutment portion of the main intermediate shaft 13. Between the taper roller bearing 86 and the ball bearing 89 the intermediate shaft 13 and intermediate gear 62 fixed thereto are end thrust bearing restrained against end movement in either direction which movement influence comes as a reaction to the angle of silent helical gears.

Thus I have described in detail my improved combined automatic and operator-optional-controllable speed changing transmission.

The operation of the dual-ratio combined speed responsive automatic and optional clutch mechanism for connecting different ratios of the variable speed transmitting unit of the present invention to the engine driven driving member follows: With the engine driven driving element $a$ at rest or rotating at a slow speed corresponding to an engine idling speed, the retractive springs 81 will operate to prevent the driving member speed responsive weights 82 from tilting in response to rotation sufficient to actuate the presser driving clutch member 71 into engagement with the one speed ratio of drive driven clutch disk 63. However, upon the operator accelerating the engine from the idling speed, the weights 82 will overcome the tension of the springs 81 and thrust the presser member 71 into engagement with the driven clutch disk 63. Subsequently, by virtue of the high tension coefficiency of the main clutch springs 78 not yielding appreciably to centrifugally effected thrust from the presser 71 through the medium of the driven disk 63, the latter is gradually clutched from a soft primary slip engagement up to a positive engagement as the engine driven driving element $a$ picks up speed. With the forward and reverse selector pinion 59 established in the position shown, this automatic primary clutch engagement operates to drive the inner clutch shaft element 13 of the concentric intermediate main transmission shafts. This automatically effects a vehicle starting speed ratio of drive through the multi-speed transmitting mechanism, progressively, through gears 62 and 56, countershaft 50, selector pinion 59, driven forward drive gear 21 and clutch member 19 to the vehicle propelling driven element $c$. This ratio most suitably should be about 2 to 1, which, with current motor vehicle power-to-car weight ratios, will give satisfactory vehicle accelerations up to a speed at which the direct drive (high) ratio will satisfactorily take on the load. But, for a low ratio of drive to start the vehicle from a state of rest, the operator may depress the clutch pedal (not shown) as he simultaneously accelerates the engine from idling. This optional actuation will result in the clutch throw-out bearing 79 being thrust forwardly, the levers 77 rocked so that the studs 73 and connected shiftable driving clutch member 65 move rearwardly, further compressing the main springs 78, and bringing the driving cone 67 into engagement with the cone 64. In this connection the reader is reminded that the centrifugal weights 82 are limited in response to speed and therefore are limited as to follow-up with respect to the member 65, which latter normally acts as a bottom friction element to the centrifugal means engagement of the driven clutch disk 63. Thus, actuation by the operator of the member 65 rearwardly renders the driving member speed responsive automatic clutch for coupling the shaft 13 to the primary driving element $a$ ineffective, and alternatively effects the coupling of the sleeve-shaped shaft 15 to turn with the primary driving element $a$. An optional low-speed ratio of drive for starting the vehicle from a state of rest results thusly, without a shift of dentate positive drive coupling means as required in conventional change speed transmissions, but because, with the direct connection of the sleeve shaft 15 to the primary driving element $a$, the drive is directed, progressively, through gears 61 and 55 (of lower speed ratio than gears 62 and 56), countershaft 50, gears 59 and 21 and roller clutch members 19 to the final driven vehicle propelling driven element $c$. By the present invention, starting the vehicle is rendered optional, without shifting, either by the driving member speed responsive (centrifugal clutch means) automatic drive coupling in intermediate speed gear simply by depressing the foot accelerator (not shown), or by optional drive coupling in a low gear by depressing the foot accelerator with the right foot and depressing the clutch pedal (not shown) with the left foot.

Having described the optional vehicle starting gears, operation of the driven member speed responsive automatic clutch means for automatically changing speeds upon the vehicle attaining a predetermined speed, either under the optional starting low gear or under the automatic starting intermediate gear, follows: The reader is first reminded, at this point, that either the optional low or the automatic intermediate initial drive coupling gears for starting the vehicle operate through the one-way forward driving clutch roller members 19, by which the vehicle propelling driven element $c$ is permitted to rotate at a higher speed while either the optional low or the automatic intermediate speed ratios of gear vehicle starting drive train remains mobilized to take the load of the final driven vehicle propelling driven element $c$. This permits of the main intermediate shaft 13 being directly coupled to drive the final driven vehicle propelling element $c$, while either the low or the intermediate gear ratios of drive couplings are maintained with the engine driven primary driving element $a$. Accordingly, while the vehicle propelling final driven element $c$ to the change speed transmitting mechanism rotates below a predetermined speed, the tension of the retractive springs 45 will prevent the driven member speed responsive weights 48 from responding to speed appreciably. The respective gear drive through the one-way driving-overrunning clutch roller members 19 thusly is maintained up to the predetermined speed attainment by the vehicle propelling driven element c. But, upon that predetermined speed of rotation by the driven element c being passed, the centrifugal weights 48 will overcome the springs 45 and act to thrust the presser driven clutch cone 35 forwardly into engagement with the under side cone face of the driving clutch member 43, whereupon the latter is in turn thrust into engagement with the driven bottom clutch cone face 28 of the driven element c. The result being automatic direct coupling of the main intermediate shaft 13 and vehicle propelling driven elements c. Either gear drive, namely the optional low or the driving member speed responsive automatic intermediate, in effect up to this driven member speed responsive automatic change speed development, relinquishes the respective ratio gear drive to the direct drive between axially aligned intermediate and driven elements 13 and c by virtue of the roller clutch members 19 unwedging between the cams 18 and the annulus 20.

*Alternative intermediate speed gear ratio.*— If the clutch pedal is depressed sufficiently to result in the clutch system comprising clutch elements 64 and 65 being engaged, with accompanying disengagement of the clutch element 63 of the forward centrifugal automatic clutch system, while the rearward centrifugal clutch system is in a state of engagement, it will be seen that the gear train comprising gears 61, 55, 56 and 62 will comprise the gear drive from the sleeve-shaped clutch shaft 15 to and for transmission through the rear end of the shaft 13 to the engaged rearward centrifugal clutch and by the latter to the driven element c. It is contemplated that this gear train should give a considerably faster gear drive ratio than either a gear train comprising gears 61, 55, 59 and 21, or a gear train comprising gears 62, 56, 59 and 21, thus providing a third speed or highest reduction gear ratio under direct drive. Accordingly, if the clutch pedal is depressed sufficiently to engage clutch elements 64 and 65 while shaft 13 is directly coupled to the driven element c, a high intermediate speed gear ratio (third speed) will come into play as an alternative to a normally establishable direct drive (fourth speed) between the driving and driven elements a and c. The friction characteristics of the clutch elements 64 and 65 and the provision for causing disengagement of the forward centrifugal automatic clutch as a preliminary to effecting engagement of clutch elements 64 and 65 provide for obtaining third speed without shutting off the power. Accordingly, a superb pick-up and climb gear is provided for which may be brought into play, as an alternative to high at any vehicle speed, without the loss of vehicle momentum which would attend a downward change in gear ratio requiring that the engine be temporarily shut off. It is the lower reduction ratio from gear 61 to 55, over that from gear 62 to 56, which imposes that the initial drive through the gears 59 and 21 will be lower if the clutch elements 64 and 65 are forced into engagement in the clutch stead of the forward centrifugal clutch unit which includes the element 63.

Reverse drive is selective and establishable by bringing the car to rest and also the engine down to idling speed, under which conditions the operator shifts the pinion 59 out of mesh (as shown) with the forward drive driven gear 21 and rearwardly into mesh with the reverse idler gear 58. Selected in reverse thusly, either the automatic or the optional of the dual input clutches may be employed to move the vehicle in reverse. The automatic driving member speed responsive clutch gives an intermediate ratio of gear drive to the selected reverse gearing through shaft 13, gears 62 to 56 and countershaft 50; the optional clutch giving a low speed ratio gear drive to the selected reverse gearing through the shaft 15, gears 61 and 55 to the countershaft 50. It will be seen that "in reverse drive selection" the shafts 13 and 31 will be rotating in opposite directions. This would seem to preclude operation of the reverse drive means of the present change speed transmission. It was however contemplated in designing this transmission and it works out accordingly in reduction to application of the subject drive relations that, since the tension coefficient of the retractive springs 45 superimpose efficient of the centrifugal weights 48 until the driven member 31 attains a speed of rotation corresponding to a vehicle speed of 15–20 miles an hour, the clutch member 43 will remain free. This affords reverse drive rotation of the driven shaft 31 up to 15 M. P. H. before confliction in rotation from the oppositely rotating shaft 13 and clutch member 43. Propulsion of the vehicle in reverse above 15 M. P. H. is not common nor good practice in vehicle operation. But should 15 M. P. H. be exceeded in reverse, the centrifugal engagement of clutch member 43 is so gradual, beginning with a frictional engagement from an initial touch, as to slowly build up a restraint against the engine similar to the action of the conventional emergency brake as applied to the propeller shaft of vehicles. The reaction is gradual and does not effect a shock upon the gearing of the transmission nor to the power-flow emanating at the engine. Engagement of the centrifugal clutch 43 simply applies a friction brake against the oppositely rotating members which corresponds to a friction brake application between members each having appreciable driving forces behind their differential of speed in the same direction.

It will be seen that a transmission constructed in accordance with the present invention will automatically couple a speed reducing gear drive transmitting train at the flywheel (driving element a) by the engagement of clutch disk 63 under influence of the centrifugal weights 62, without the driver interceding through the medium of actuating the optional cone clutch 67. It will also automatically effect a change of speed drive by the centrifugal automatic clutch c engaging at a predetermined speed of rotation attainment by the driven member 30, also without the driver interceding through the medium of actuating the cone 67 (optionally engageable) flywheel clutch unit). By depressing the clutch pedal the control of the driving member speed responsive automatic clutch is superimposed, and if the driven member speed responsive automatic clutch is not yet closed, establishes the transmission in a low speed reduction gear drive. If the driven member speed responsive automatic clutch is closed, depressing of the clutch pedal establishes the transmission in an intermediate speed reduction gear drive. By virtue of the positive gearing provision, namely, gears 61 and 55 and 56 and 62 two-way drive connecting the dual intermediate shafts 13 and 15, a transmission constructed in accordance with my present invention further provides, that once in the high speed drive ratio, depressing of the clutch pedal reverts the transmission (at any vehicle speed over that at which the driven member speed responsive automatic clutch closes, say 15 M. P. H.) into a positive intermediate speed ratio gear in which the engine compression as a brake may be employed for, or as is commonly called, compression. This latter feature obviously makes for far greater safety of driving than the positive intermeshable gear or positive jaw clutch shift provision to the same end found in all conventional and in most automatic change speed transmission proposals.

The improved form of the combined speed responsive automatic and optionally engageable change speed clutch mechanism shown in the present invention for coupling to the primary driving member represents the simplest construction of friction clutch means for multi-drive coupling before the torque is multiplied. And the improved form of driven member speed responsive automatic friction clutch construction shown in the present invention represents the simplest form for highest drive coupling clutching co-efficiency after the torque is multiplied.

Thus it will be seen that I have provided the simplest form of combined driving and driven member speed responsive automatic initial drive coupling and change speed functioning automatic transmission, and the simplest form of optional change speed control for superimposing that of the automatic. This does not depart with respect to character of detail parts from that with which manufacturers are familiar and experienced and equipped to produce. It will be seen that the present invention utilizes both, the simplest form of gears, namely the wheel type, and the simplest form for effecting torque multiplication, namely the fixed axis type of parallel countershaft carrying different sizes of wheel gears in cluster. In all, making for greater ruggedness, least complication and cost in manufacture, and least need for revising of manufacture tooling and serving instructions.

I claim:

1. In a power transmitting mechanism which includes one revolvable power transmitting member and two other concentric power transmitting members coaxial with said one member, one of said two other members being a low speed the other a high speed driving ratio associate member, a two way operable friction clutch mechanism for alternatively coupling either of said other two members to rotate with said one member comprising a friction clutch element connected to rotate with one of said two other members and another friction clutch element connected to rotate with the other of said two members, a bottom clutch element to rotate with said one member and for alternative association with said friction clutch element that is rotatable with one and said friction clutch element that is rotatable with the other of said other two members and accordingly movably disposed between the named two friction clutch elements, resilient means tending to urge said bottom element into a normal position in which it will be disengaged from one of said two-named friction clutch elements and in which it may serve as a bottom clutch element for the other of said two-named friction clutch elements to be clutch packed thereagainst, said resilient means for resisting the pressure of such clutch packing, a presser clutch element to rotate with said one member and disposed operatively on the opposite side of said other of said two-named friction clutch elements with respect to said bottom element, retractive resilient means tending to urge said presser element out of engagement with the friction clutch element that is disposed between said presser and bottom elements, means operable in response to the speed of said one member for actuating said presser element toward said bottom element thereby to clutch pack the one of the two-named friction clutch elements therebetween when said one member has attained sufficient speed of rotation, and means for progressively actuating said bottom element out of said normal position at will whereby the clutching unit comprising said bottom and presser elements and said speed responsive means will be rendered inoperable and said bottom element will thereafter be brought into clutching relation with the other of the two named friction clutch elements.

2. In a multi-clutch mechanism, the combination of a low speed associate friction clutch element and a higher speed associate friction clutch element, a power transmitting member, clutching means selectively operable to clutch said low and higher speed clutch elements to rotate with said power transmitting member including resilient means normally tending to urge declutching state relations of both said low and higher speed clutch elements, centrifugally operable means for overcoming the influence of such of said resilient means when said power transmitting member has attained a sufficient speed of rotation and for actuating said clutch mechanism as will result in clutching of one only of said low and higher speed clutch elements, and means operable at will for either adjusting said clutch mechanism so that said centrifugally operable means can not effect said clutching of its associated one of said clutch elements or for so doing and still further effecting clutching of the other of said low and higher speed clutch elements.

3. In a multi-clutch mechanism, in combination with one power transmitting member and both a low speed associate clutch element and a higher speed associate clutch element respectively to be alternatively clutched to rotate with said one power transmitting member, of means normally operable to cause disengagement of said clutch mechanism from both said low and said higher clutch elements, means for automatically actuating said clutch mechanism to clutch one only of said low and higher speed clutch elements to rotate with said one power transmitting member when said power transmitting member for said clutch mechanism attains sufficient speed of rotation, and means operable at will under progressive actuation, first, to open said clutch mechanism beyond capability of said automatic means accomplishing said clutching of said one only of said low and higher speed clutch elements, and at will secondly, to effect clutching of the other of said low and higher speed clutch elements including a movable clutch element adapted to serve as an associate to one of said low and higher speed clutch elements at a time with means including resilient means tending to normally position said movable clutch element only so that said automatic means for clutching said one only of said low and higher speed clutch elements may complete that function and with means for actuation at will operable to move said movable clutch element firstly out of said normal position and secondly into association with the other of said low and higher speed clutch elements.

4. In combination with an engine flywheel and two concentric shafts coaxial therewith, of a presser friction clutch element and a bottom friction clutch element both carried in rotation with said flywheel, a low speed associate clutchable friction element and a higher speed associate clutchable friction element one carried in rotation with one and the other carried in rotation with the other of said two shafts, one of said low and higher speed clutchable elements disposed clutchably between said presser and bottom elements and the other disposed on the opposite side of said bottom element, resilient means tending to hold said bottom element in a normal position out of engagement with the respective clutchable element that is disposed on its said opposite side and so that said presser element, upon being actuated towards said bottom element, may accomplish clutch packing of the respective clutchable element that is disposed therebetween, means for automatically actuating said presser element towards said bottom element when said engine flywheel has attained sufficient speed of rotation, and means operable at will, for first actuating said bottom element relatively away from the position of said presser element sufficiently to create an open clutch space therebetween greater than the clutching range of said automatic means for actuating said presser element, and for still further actuating said bottom element in the same direction at will to bring same into engagement with the clutchable element aforesaid that is disposed on said opposite side of said bottom element.

5. In a multi-clutch mechanism, the combination of two separately resilient means normally disengaged friction clutching units in a single assembly, centrifugally operable means for automatically effecting engagement of one only of said two clutching units when sufficient speed of rotation has been attained by certain of the elements of said clutch mechanism, a movable clutch element adapted to normally operate as a clutch associate to said one centrifugally engageable clutching unit, said movable element forming means for actuation out of range of said operation as an associate of said centrifugally engageable clutching unit and for actuation at will still further as an associate to complete clutch function of the other of said two clutching units, individual resilient means operating on said movable clutch element and normally tending to position same for association with said centrifugally engaging clutching unit, and means employable at will for forcing said movable element out of said position progressively into a first other position in which both clutching units will be rendered neutral and in which said movable element may be sustained, and at will, into a progressively second other position in which it will complete clutch function of the other of said two clutching units.

6. In a multi-clutch mechanism, two separately clutch operable clutch systems having a common element adapted to be positioned as an associate to one of said two clutch systems with resilient means tending to so position said element, centrifugally operable means for actuating said one of the two clutch systems into engagement depending upon said common clutch element being positioned as aforesaid as an associate to said one clutch system in order to effect the respective clutch function, and means for actuating said common clutch element out of said position either, into another position to render said one clutch system inoperative by said centrifugally operable means, or into still another position thereby to cause engagement within the other of said two clutch systems.

7. In a variable speed power transmission having one power transmitting member and two other power transmitting members one of which two other members comprising a member associated with low speed ratio and the other comprising a member associated with a high speed ratio, two clutch units each having resilient means tending to normally disengage the respective clutch unit, means for automatically actuating the one clutch unit that is associated with the high speed ratio member into clutch function operable incidental to one of said power transmitting members being rotated at sufficient speed, a shiftable member adapted to be normally held in one position thereby forming means solely whereby said automatic means aforesaid for actuating the high speed associate one of the two clutch units may accomplish said clutch function, the resilient means for normally tending to disengage the other of the two clutch units and also forming means for yieldingly urging said shiftable member into said one position, said shiftable member adapted to be forced out of said one position and into either of two other positions in one whereby solely said one clutch unit will be opened beyond clutch function actuation from said automatic means to that end and in the other position said shiftable member adapted to establish the other of the two clutch units in clutch function, and means operable at will for forcing said shiftable member out of said one position and into either of said two other positions.

8. A multi-clutch mechanism having a centrifugally automatically operable separate clutching clutch system of elements and a solely alternatively but normally disengaged separate clutching clutch system of elements each forming separate clutch mechanism for different speed ratios of power transmission mechanism, with a shiftable mass constituant of said multi-clutch mechanism adapted to normally rest in one position therein to form means solely whereby said centrifugally operable separate clutch system may attain clutch function and also in said position of rest effecting a fully disengaged state of said normally disengaged separate clutch system, resilient means tending to place said shiftable mass in said one position, said shiftable mass movable out of said one position and into another position effectual to open said centrifugally operable clutch system beyond centrifugal means actuated clutchability and in said other position also to constitute a clutching state of said normally disengaged clutch system, and means employable at will for forcing said shiftable mass out of said one position and into said other position.

9. In a multi-clutch mechanism, the combination of a driving presser clutch plate, a driving bottom clutch plate, a driven clutch disk therebetween, a driven clutch cone, a driving clutch cone portion of said bottom plate for optional engagement with said driven clutch cone, resilient means tending to hold said bottom plate and said driving cone thereof out of engagement with said driven cone, automatically operable means for actuating said presser plate towards said bottom plate thereby to clutch pack said driven disk therebetween but depending upon said bottom plate being retained in a given position out of engagement with said driven cone to enable said packing of said driven disk, and means employable at will for forcing said bottom plate and driving cone to move relatively away from said presser plate either solely sufficiently to render said driven disk non-clutchable by said presser plate, or progressively until said driving cone engages said driven cone clutch effectively.

10. In a change speed power transmission, a driving member, a driven member, variable speed transmission mechanism between said members, a centrifugally operable clutch unit associated with certain of the speed ratios of said mechanism and having a movable element provided with compressed springs acting thereon and under the energizing of said springs said element adapted to normally assume a function of resisting forces, as may emanate from the centrifugally actuated movement in said clutch operating toward and adapted to culminate in clutch engagement, and in rendering said resistance solely whereby said clutch may become centrifugally engaged, said element adapted to be moved in further compression of said springs out of range of rendering said resistance to the centrifugally operable clutch unit whereby the latter will be abnormally opened beyond centrifugal means clutchability, and other clutch means adapted to be effected by said element when the latter is moved sufficiently in said further compression of said springs to render an alternative clutch function to that of said centrifugally operable clutch unit, said alternative clutch associated with certain other of the speed ratios of said mechanism.

11. In an automatic power transmitting mechanism, in combination, a centrifugally automatically operable clutch unit having a movable element provided with means including resilient means for normally energizing it to occupy one position in which it is adapted to assume resistance to culminative centrifugally created forces that are adapted to effect engagement of the respective clutching unit, the centrifugally operable means of said clutching unit having actuating range to accomplish engagement of the respective clutching unit only when said element occupies substantially said one position, means for actuating said element over the influence of said resilient means out of said one position sufficiently to establish said clutching unit beyond said centrifugal actuating range for accomplishing its engagement, another and separate clutching unit, and said movable element adapted, by being moved out of said one position sufficiently and under energizing to that end, to cause clutch function to develop in said other clutching unit.

12. In a multi-clutch mechanism, the combination of a centrifugally movable clutch presser member, another movable member operable as a bottom pressure clutch member opposite said presser member, said two-named movable members in connection to rotate together, a clutchable member between said two-named movable members and normally rotatable relative thereto, another clutchable member normally rotatable relative to each said two-named movable members and said first-mentioned clutchable member, said other clutchable member positioned establishable in clutch functioning union with said other movable member by movement of the latter relatively away from said first-mentioned clutchable member, and means for alternatively actuating said other movable member in opposite clutch related directions.

13. A selective multi-clutch mechanism combining a centrifugally automatically engageable clutch unit and a solely alternatively engageable clutch unit the latter clutch unit having resilient means for normally disengaging same and of such status with respect to said solely alternatively engageable clutch unit as to provide a normal adjustment of said multi-clutch mechanism solely whereby said centrifugally engageable clutch unit is enabled to attain clutch function under actuation from its centrifugal means to that end, and means for actuating said alternatively engageable clutch unit into clutch engagement whereby said centrifugally engageable clutch unit will be opened beyond clutchability without effecting the motion range of the centrifugal actuation element of said centrifugally engageable clutch unit.

14. In a multi-clutch mechanism, two separately clutchable units one provided with centrifugally operable means for engaging same and the other provided with resilient means for normally maintaining its disengagement, means whereby said other clutch unit is normally disengaged forming bottom pressure means upon which said centrifugally engageable clutch unit depends for reaction to its centrifugal clutch packing function, and means employable at will for forcing said disengaging means of said normally disengaged clutch unit out of bottom pressure relationship with said centrifugally engageable clutch unit and into a clutch functioning position relative to said other clutch unit.

15. In multi-clutch mechanism, in combination, a rotatable bottom pressure member, a relatively rotatable presser member, an intermediate member, an element positioned clutchable between said presser and intermediate member, said element mounted rotatable relative to either of said presser, intermediate and bottom pressure members, said intermediate member adapted establishable into clutch relation with said bottom pressure member while said element aforesaid adapted clutchable between said presser and intermediate members is maintained non-clutch packed between said presser and intermediate members, and speed responsively controlled means effective to accomplish the clutch packing of said clutchable element between said presser and intermediate members.

EVERETT R. BURTNETT.